(12) United States Patent
McLemore

(10) Patent No.: US 7,640,693 B2
(45) Date of Patent: Jan. 5, 2010

(54) SNAKE FENCE

(75) Inventor: Paul Sampson McLemore, 912 High Point Ridge Rd., Franklin, TN (US) 37069

(73) Assignee: Paul Sampson McLemore, Franklin, TN (US)

( * ) Notice: Subject to any disclaimer, the term of this patent is extended or adjusted under 35 U.S.C. 154(b) by 175 days.

(21) Appl. No.: 11/784,567

(22) Filed: Apr. 9, 2007

(65) Prior Publication Data

US 2008/0244958 A1 Oct. 9, 2008

(51) Int. Cl.
*A01M 23/08* (2006.01)
(52) U.S. Cl. .................... 43/60; 43/64; 43/65
(58) Field of Classification Search ........... 43/58, 43/60, 64, 65, 124
See application file for complete search history.

(56) References Cited

U.S. PATENT DOCUMENTS

| | | | | |
|---|---|---|---|---|
| 4,286,405 A | * | 9/1981 | Howard | 43/87 |
| 4,301,996 A | * | 11/1981 | Holyoak | 256/1 |
| 4,370,823 A | * | 2/1983 | Moorhead | 43/7 |
| 4,449,316 A | * | 5/1984 | Moorhead | 43/10 |
| 4,489,516 A | * | 12/1984 | Moorhead | 43/7 |
| 2007/0277425 A1 | * | 12/2007 | Beck | 43/65 |

FOREIGN PATENT DOCUMENTS

JP 2006-20 * 1/2006

* cited by examiner

*Primary Examiner*—David J Parsley

(57) ABSTRACT

The Snake Fence (1), especially for catching snakes. The netting is attached to upright staking material (2) which is hammered into the ground. The netting follows the staking material and is attached to the staking material (3) and then secured to the ground by fasteners (4). It is the single, double, or multiple layering of netting that catches the snakes and holds the snakes. The snakes cannot extricate themselves from the netting. The netting is proportional in size to the snake being caught; the staking material is proportional in size to the netting; the fasteners are proportional in size to the staking material.

1 Claim, 3 Drawing Sheets

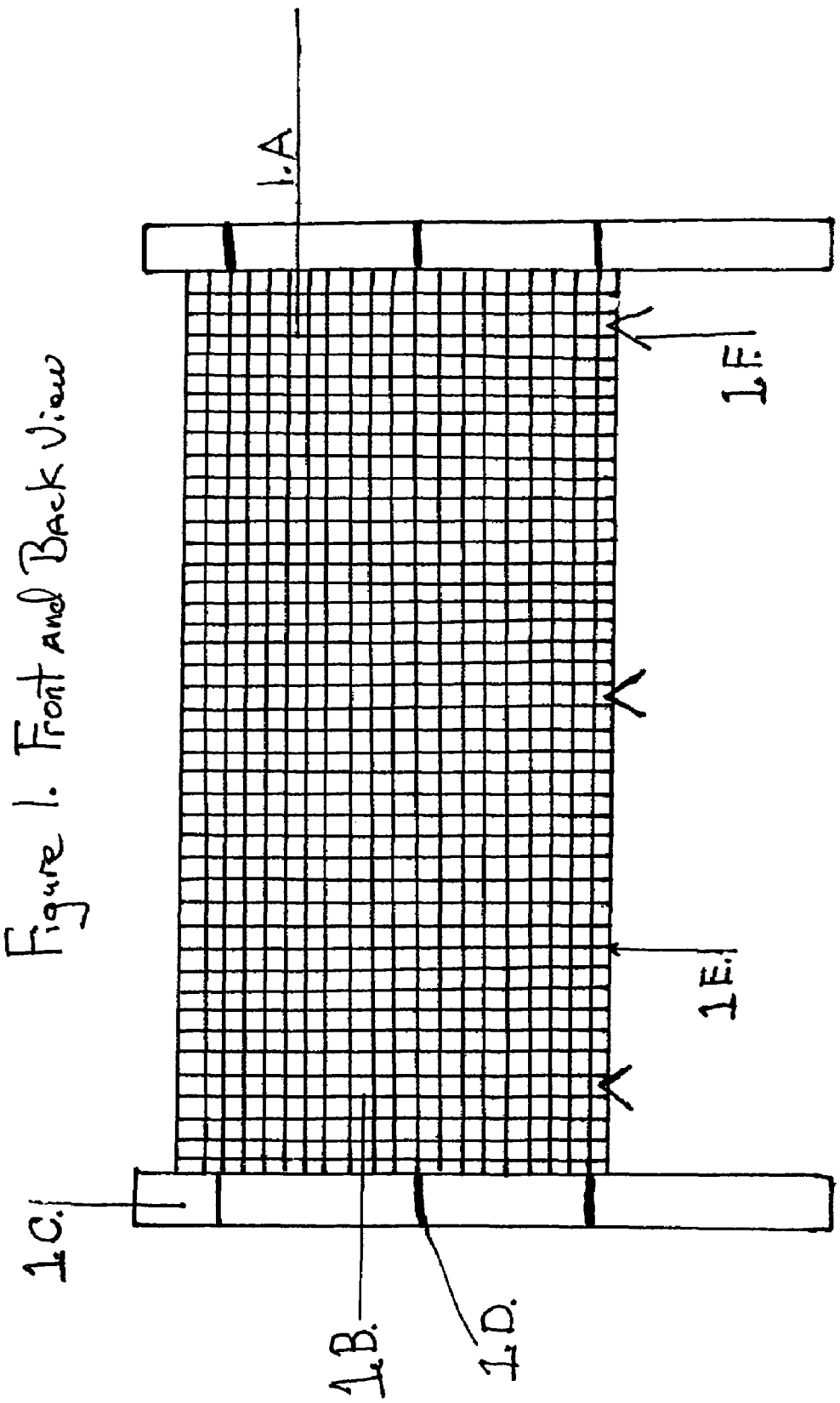

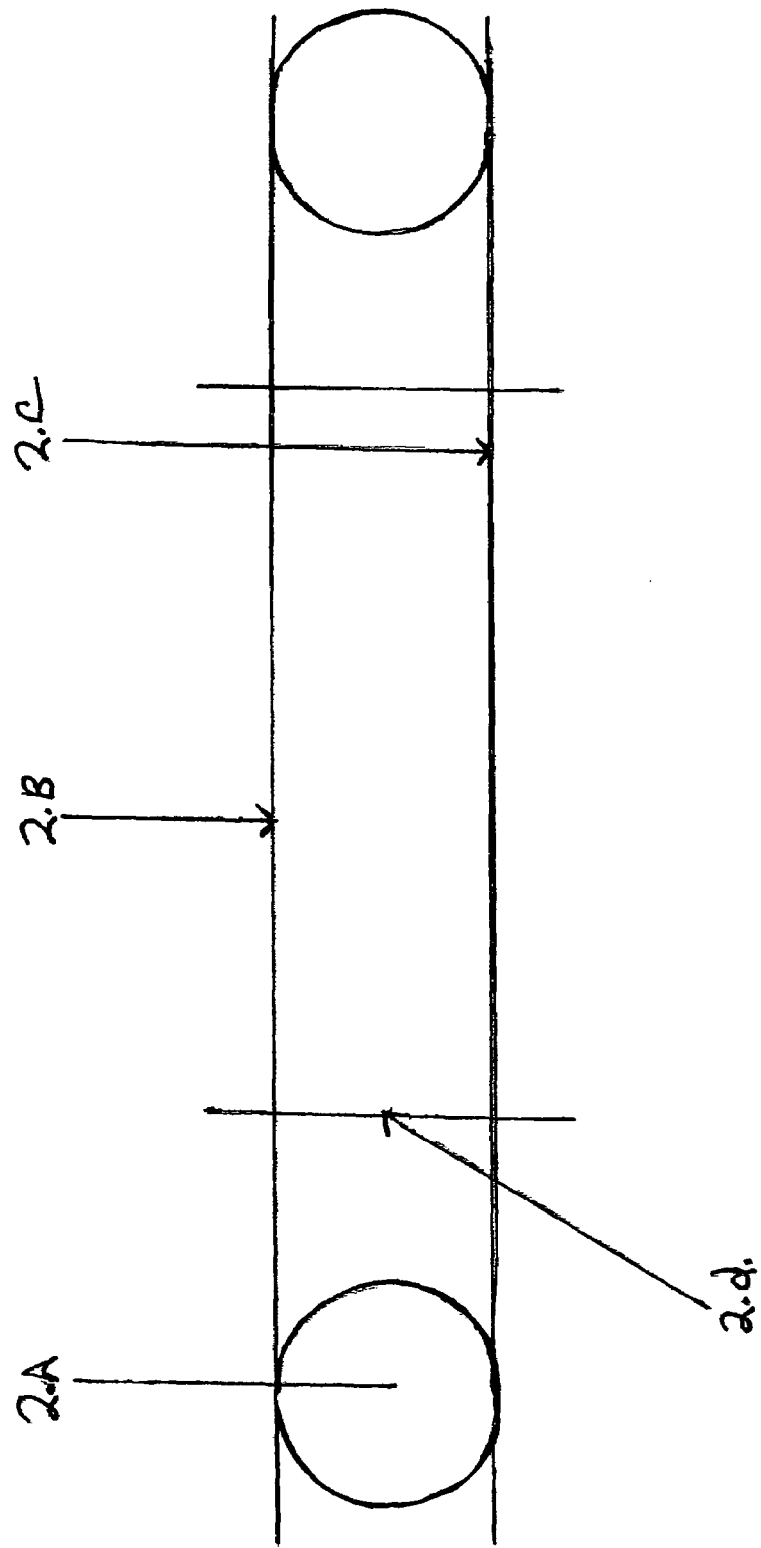
Figure 2. Overhead View

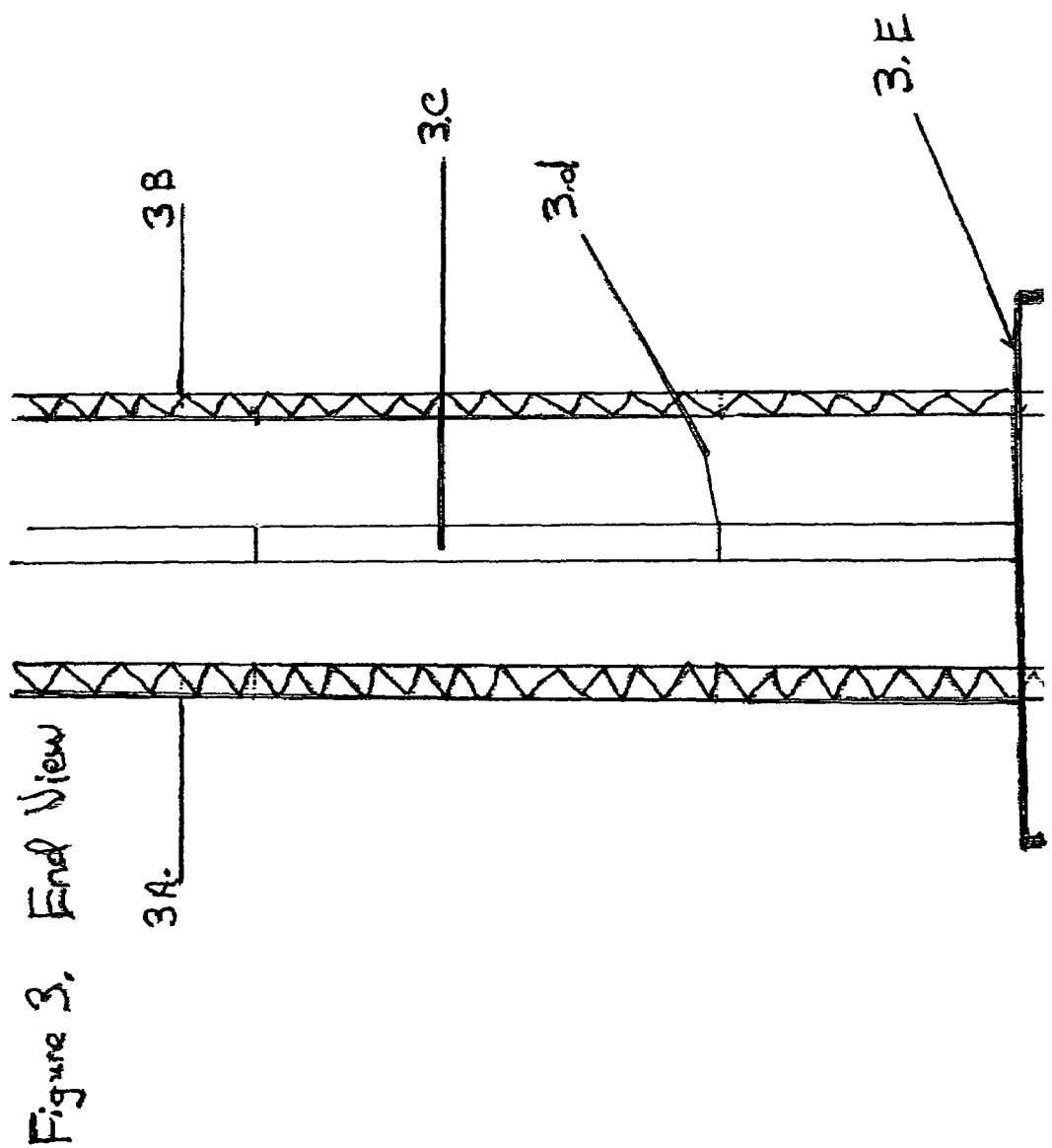

SNAKE FENCE

The snake fence consists of differing lengths of hard upright stakes (1C) placed in the ground with a polyethylene or polyurethane extruded netting (1A, 1B) of one or more layers fastened to the stake (1C) at various intervals to secure the netting (1A, 1B) to the upright (1C) to firmly hold together insuring the integrity of the fence to be able to entrap a snake; the size of the opening of the netting (1A, 1B) has to be proportionately smaller than the diameter of the snake being caught. There are various sizes of the snake fence to accommodate the various sizes and shapes of snakes' heads and bodies. The netting (1A, 1B) of the snake fence is attached to the ground (1E) at various intervals by fasteners (1F) that hold down the netting (1A, 1B) and prevent the snake from crawling under the netting (1A, 1B) of the snake fence. The fasteners (1F) also secure the netting (1A, 1B) of the snake fence to the ground to insure the length and integrity of the snake fence.

SUMMARY OF INVENTION

It is the purpose of this invention to catch snakes by incorporating netting, upright staking material, and fasteners of various sizes which are dependent on the size of the snake to be caught. The netting is held by the firm upright staking material which is affixed by fasteners to the netting and the stakes are hammered into the ground. The installation and maintenance is very simple.

BRIEF DESCRIPTION OF THE DRAWINGS

The invention will now be described in more detail with reference to the drawings whereby:

FIG. 1 shows the front and rear view of the snake fence
FIG. 2 shows the overhead view
FIG. 3 shows the end view
FIG. 1. A. Poly netting (1)
1. B. Poly netting (2)
1. C. Steel upright stake
1. D. Fastener
1. E. Ground Level
1. F. Ground Staple
FIG. 2. A. Steel upright stake
2. B. Poly netting (1)
2. C. Poly netting (2)
2. D. Ground Staple
FIG. 3. A. Poly netting (1)
3. B. Poly netting (2)
3. C. Steel upright stake
3. D. Fastener
3. E. Ground staple

DETAILED DESCRIPTION OF THE INVENTION

Referring to FIG. 1 of the drawing denotes generally the present invention front and back view which is comprised of steel upright stakes 1C, poly netting 1A/1B, fasteners 1D, and ground staples 1F. The steel upright stakes 1C are round. The poly netting 1A/1B is either polyethylene or polyurethane with openings in the mesh determined by the horizontal and vertical grid pattern which has to be slightly smaller than the snake to be caught. The fasteners 1D are rings which attach the poly netting 1A/1B to the steel upright stakes 1C at intervals appropriate to the size and weight of the poly netting 1A/1B. The ground staples 1F are U-shaped and placed in the ground at intervals appropriate to keep the poly netting 1A/1B flush with the ground 1E.

Referring to FIG. 2 of the drawing denotes generally the present invention over-head view which is comprised of steel upright stakes 2A, poly netting 2B/2C, and ground staples 2D. The steel upright stakes 2A are placed into the ground vertically and at intervals sufficient to support the poly netting 2B/2C. The steel upright stakes 2A are directly attached to the two layers of poly netting 2B/2C and the layers of poly netting 2A/2B are horizontally spaced apart by the circumference of the stakes 2A. The U-shaped ground staples 2D attach the poly netting 2B/2C to the ground by holding the netting firmly by the horizontal top of the staple 2D so as not to allow anything to be between the poly netting 2B/2C and the ground; this prevents the snake from crawling under the snake fence.

Referring to FIG. 3 of the drawing denotes generally the present invention end view which is comprised of steel upright stakes 3C, poly netting 3A/3B, fasteners 3D, and ground staples 3E. The poly netting 3A/3B should be smooth and fairly taut between the steel upright stakes 3C; the tensile strength of the poly netting 3A/3B should be sufficiently strong enough to hold a snake once it is caught in the netting. It is the nature of the snake to try and go through the poly netting 3A/3B and not around it; the snake will become caught up in the netting 3A/3B when it has approximately one-third of its body caught up in the poly netting 3A/3B the snake will try to back out of the poly netting 3A/3B but cannot because the scales on the underbelly of the snake get hung up on the woven mesh of the poly netting 3A/3B. The horizontal and vertical weave of the poly netting 3A/3B is dependent on the size of snake to be caught. The spacing of the steel upright stakes 3C is five foot. The number of fasteners 3D is dependent on the size of poly netting 3A/3B which is dependent on the size of snake to be caught with a minimum of five fasteners to each stake 3C. The number of ground staples 3E needed is dependent on the ground surface with a more challenging surface requiring more staples 3E to keep the poly netting 3A/3B flush to the ground so as to prevent the snake from crawling under the netting 3A/3B.

The invention claimed is:

1. A snake fence for catching snakes, said snake fence comprising, first and second rectangular layers of netting having mesh openings of each said layers of netting being proportionately smaller than a diameter of a snake to be caught, each of said layers of netting formed of polyethylene or polyurethane, each of said layers of netting having a first end and a longitudinally spaced opposing second end, a first and second stake, each stake being round, steel, and vertically disposed to be placed into a ground surface, each stake having a first end and a second end opposite the first end, the first stake directly attached to the first end of the first layer of netting at the first end of said first stake and the first stake directly attached to the first end of the second layer of netting at the second end of the first stake, the second stake directly attached to the second end of the first layer of netting at the first end of said second stake and directly attached to the second end of the second layer of netting at the second end of the second stake, wherein the layers of netting are horizontally spaced apart from each other by the circumference of the stakes, thereby forming a gap between the layers of netting extending entirely along the lengths of the layers of netting, a plurality of ground staples directly attached to the bottom of each of the layers of netting, each of said ground staples disposed perpendicular to each of the layers of netting thereby extending across the gap between the layers of netting, said ground staples each adapted to be placed into the ground surface to keep the layers of netting in contact with the ground surface to keep snakes from crawling under the layers of netting, each staple being an inverted U-shape, having a horizontal portion extending between two downwardly disposed vertical portions disposed at each end of the horizontal portion, the horizontal portions of each of the staples directly contacting the bottoms of each of the layers of netting and the vertical portions of each of said staples adapted for placement in the ground surface.

* * * * *